United States Patent
Burckhardt et al.

[11] Patent Number: 5,244,601
[45] Date of Patent: Sep. 14, 1993

[54] RESISTOR COMPOSITION AND ITS USE

[75] Inventors: Hans-Georg Burckhardt, Frankfurt; Frieder Gora; Karl-Heinz Guldner, both of Aschaffenburg; Jürgen Dehoust, Hanau; Christina Modes, Darmstadt; Joachim Schmidt, Hanau; Rainer Kiemel; Sybille Kemmler-Sack, both of Tübingen, all of Fed. Rep. of Germany

[73] Assignee: W. C. Heraeus GmbH, Hanau, Fed. Rep. of Germany

[21] Appl. No.: 624,979

[22] Filed: Dec. 10, 1990

[30] Foreign Application Priority Data

Dec. 14, 1989 [DE] Fed. Rep. of Germany ....... 3941283

[51] Int. Cl.$^5$ .......................... H01B 1/08; H01C 7/00; H01C 7/02
[52] U.S. Cl. ..................... 252/518; 252/521; 338/22 R; 338/308; 501/17; 501/19; 501/20; 501/21; 501/32
[58] Field of Search ............. 252/518, 521; 338/22 R, 338/225 D, 308; 501/17, 19, 20, 21, 32

[56] References Cited

U.S. PATENT DOCUMENTS

| | | | |
|---|---|---|---|
| 3,630,969 | 12/1971 | Popowich | 252/514 |
| 3,896,055 | 7/1975 | Bouchard et al. | 252/521 |
| 3,950,597 | 4/1976 | Scheiber | 252/518 |
| 3,974,107 | 8/1976 | Carcia | 252/520 |
| 4,420,422 | 12/1983 | Ferretti | 252/518 |
| 4,439,352 | 3/1984 | Asada et al. | 252/518 |
| 4,536,328 | 8/1985 | Hankey | 252/518 |
| 4,649,125 | 3/1987 | Takeuchi et al. | 501/15 |
| 4,814,107 | 3/1989 | Steinberg | 252/512 |
| 4,906,406 | 3/1990 | Hormadaly | 252/518 |
| 4,961,999 | 10/1990 | Hormadaly | 428/427 |
| 5,021,194 | 6/1991 | Watanabe et al. | 252/518 |
| 5,069,824 | 12/1991 | Blanke et al. | 252/518 |

FOREIGN PATENT DOCUMENTS 2115814 3/1973 Fed. Rep. of Germany.
3914844 11/1990 Fed. Rep. of Germany.

OTHER PUBLICATIONS

*Handbook of Electronic Packaging* ed. by Charles Harper, McGraw Hill Book Co. 1969 pp. 5-1, 5-20, 5-21.
*Materials Research Bulletin* vol. 21 pp. 1131-1136, 1986 (Muller et al).
Römpps Chemie-Lexicon, pp. 3062, 3419, 3420.
Journal of Solid State Chemistry, 33, 257-261 (1980) (in French).

*Primary Examiner*—Linda Skaling
*Attorney, Agent, or Firm*—Felfe & Lynch

[57] ABSTRACT

Resistor composition to produce thick film resistors, preferably the resistor films in sensors for temperature measurement, includes glass frit and an oxide which is at least one of $CaCu_3Ru_4O_{12}$ and $LaCu_3Ru_4O_{12}$.

5 Claims, 1 Drawing Sheet

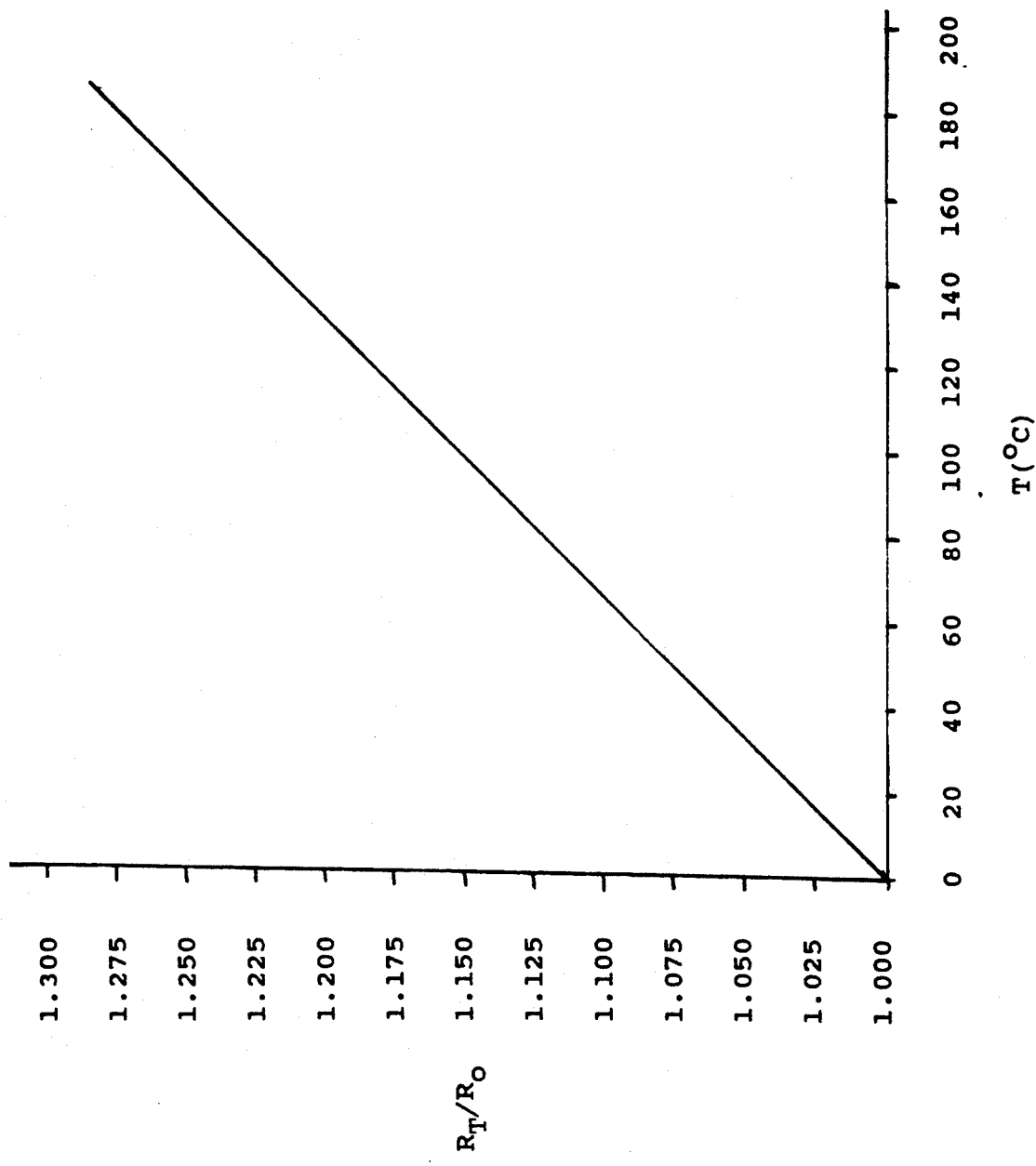

RESISTOR COMPOSITION AND ITS USE

BACKGROUND OF THE INVENTION

The invention relates to a resistor composition which comprises oxide, containing copper and ruthenium, and glass frit and the use thereof.

U.S. Pat. No. 3,896,055, which is hereby incorporated by reference, describes electrical resistor compositions containing as an electrically conductive phase polynary oxides having a pyrochlore related crystal structure of the general formula $M_xM'_{2-x}M''_2O_{7-z}$ where M is silver and/or copper, M' is bismuth or a mixture of at least ½ bismuth plus up to ½ cadmium, lead, yttrium, thallium, indium and/or rare earth metal and M'' is ruthenium, iridium and/or a mixture of at least 3/4 ruthenium and/or iridium and up to ¼ platinum and/or titanium and/or rhodium. In an amount of 5-90%, they form, together with glass frits or other suitable inorganic binding agents, the solid substance portion of the resistor compositions. In order to be printable, these compositions must contain a liquid organic carrier, for example a solution of ethyl cellulose in terpineol. Resistors of a particularly low specific resistance and a flat response of the specific resistance to temperature can be produced by firing the resistor compositions onto dielectric substrates, for example aluminum oxide, at approximately 650°-950° C.

U.S. Pat. No. 4,420,422 concerns a method of preparing pyrochlore compounds of the general formula $Bi_{2-x}M_xB_2O_{7-z}$ where M=cadmium, copper, lead, indium, gadolinium and/or silver and B=ruthenium and/or iridium all of which have a high surface area and are suitable for resistors with relatively low values for the temperature coefficient of resistance in a range between +25° C. and +125° C.

Resistor compositions which contain oxides of the general formula $M_xM'_y(Pb, Bi)_{2-x-y}Ru_2O_{7-z}$ where M=copper and/or silver, M'=calcium, strontium, and-/or barium are known from German application P 39 14 844.0. The resistor films made from these resistor compositions are distinguished by a low temperature coefficient of resistance and only a small difference between the temperature coefficient of resistance in the range of 25° C. to +125° C. and the temperature coefficient of resistance in the range of −55° C. to +25° C.

SUMMARY OF THE INVENTION

It is an object of the invention to find a resistor composition of the above characterized kind which can be fired in an air atmosphere for the manufacture of thick film resistor elements having a high temperature coefficient of resistance at a relatively high sheet resistance.

The object is accomplished with a resistor composition having an oxide that consists of $CaCu_3Ru_4O_{12}$ and/or $LaCu_3Ru_4O_{12}$.

The resistor composition proved to be particularly suitable when it consists of 5-90 wt.-%, preferably 10-50 wt.-%, oxide and 10-95 wt.-%, preferably 50-90 wt.-%, glass frit.

As can be understood from the Journal of Solid State Chemistry, 33, 257-261 (1980), the oxides $CaCu_3Ru_4O_{12}$ and $LaCu_3Ru_4O_{12}$ which have a perovskite-like crystal structure can be obtained by reacting calcium carbonate with copper oxide and ruthenium oxide and by reacting of lanthanum oxide with copper oxide and ruthenium oxide.

The resistor composition may contain any type of glass frit conventionally used for this purpose. A resistor composition which contains $CaCu_3Ru_4O_{12}$ and/or $LaCu_3Ru_4O_{12}$ together with lead aluminosilicate glass frit or lead aluminoborosilicate glass frit proved to be particularly suitable.

In addition to the solid substances, the resistor composition usually also contains an organic medium as liquid carrier and is then present as paste containing about 65-85% wt.-% finely divided solid substances generally with an average particle size of not more than 20 micrometer. It can applied onto dielectric substrates by means of screen-printing, for example. The liquid carrier usually consists of a solution of an organic polymer, for example, acrylic resin or ethyl cellulose, in an organic solvent, for example terpineol or butyl carbitol (butylglycol acetate), as they are usually used for resistor pastes.

The resistor pastes are prepared in a known way by mixing the components of which it consists. After the pastes are printed onto the substrates, for example aluminum oxide substrates, and the drying of the pastes by evaporating the solvent, the printed substrates are fired in air at approximately 700°-900° C.

The resistor films produced in accordance with the invention from resistor compositions are distinguished by high positive temperature coefficients of resistance. At a sheet resistance of approximately 10-500 ohm/square, they have a temperature coefficient of resistance which, in a range between +25° C. to +125° C., is greater than 1000 ppm/K.

The resistor composition is hence particularly suitable for the manufacture of temperature-dependent resistor films in sensors for temperature measurement.

BRIEF DESCRIPTION OF THE DRAWING

The sole FIGURE is a plot of the ratio of the resistance at temperature T to the resistance at 0° C., $R_T/R_O$, versus temperature T.

DETAILED DESCRIPTION OF THE PREFERRED EMBODIMENT

The following examples explain in further detail the manufacture of resistor compositions present as resistor pastes in accordance with the invention and of resistor films from these pastes.

The thickness of the dried films d [μm], the sheet resistance $R_f[\Omega/\square]$, and the temperature coefficient of resistance in the range of +25° C. to +125° C., HTCR [ppm/K] ("Hot Temperature Coefficient of Resistance") of the resistor films obtained by firing the pastes onto aluminum oxide substrates are given.

Example 1

A mixture of 22.2 wt.-% $CaCu_3Ru_4O_{12}$ and 77.8 wt.-% of a glass frit of 62 wt.-% PbO, 29 wt.-% $SiO_2$, 6 wt.-% $Al_2O_3$ and 3 wt.-% CdO having an average particle size of 3-6 micrometer and a 5% solution of ethyl cellulose in terpineol are mixed on a roll mill in a 3 to 1 ratio until a paste is formed. The paste is printed through a screen of stainless steel {200 mesh}onto $Al_2O_3$-substrates of 50×50×0.63 mm in dimension. For 10 minutes it is dried in air at 150° C. and then fired in a belt furnace at a peak temperature of 850° C. for about 10 minutes with a total firing cycle of about 1 hour.

The thickness of the dried films, the sheet resistance referred to a thickness of the dried films of 25 micrometers and the temperature coefficient of resistance of the so produced resistor films are provided in the table.

Example 2

A mixture of 22.2 wt.-% $LaCu_3Ru_4O_{12}$ and 77.8 wt.-% of a glass frit of 62 wt.-% PbO, 29 wt.-% $SiO_2$, 6 wt.-% $Al_2O_3$ and 3 wt.-% CdO having an average particle size of 3-6 micrometer and a 5% solution of ethyl cellulose in terpineol are mixed on a roll mill in a ratio of 3:1 until a paste is formed. The paste is printed through a stainless steel screen {200 mesh} onto $Al_3O_3$ substrates of 50×50×0.63 mm in dimension. For 10 minutes it is dried in air at 150° C. and then fired for 10 minutes in a belt furnace at a peak temperature of 850° C. for about 10 minutes with a total firing cycle of about 1 hour.

The thickness of the dried films, the sheet resistance referred to a thickness of the dried films of 25 micrometers and the temperature coefficient of resistance of the so produced resistor films are provided in the table.

Example 3

A mixture of 22.2 wt.-% $LaCu_3Ru_4O_{12}$ and 77.8 wt.-% of a glass frit of 49.5 wt.-% PbO, 34 wt.-% $SiO_2$, 8.4 wt.-% $B_2O_3$ 3.1 wt.-% $Al_2O_3$ and 5 wt.-% CaO having an average particle size of 3-6 micrometer and a 5% solution of ethyl cellulose in terpineol are mixed on a roll mill in a ratio of 3:1 until a paste is formed. The paste is printed through a stainless steel screen (200 mesh) onto $Al_2O_3$ substrates of 50×50×0.63 mm in dimension. For 10 minutes it is dried in air at 150° C. and then fired for 10 minutes in a belt furnace at a peak temperature of 850° C. for about 10 minutes with a total firing cycle of about 1 hour.

The thickness of the dried films, the sheet resistance referred to a thickness of the dried films of 25 micrometers and the temperature coefficient of resistance of the so produced resistor films are provided in the table below.

| Example | oxide/glass [wt.-parts] | d [μm] | $R_f [\Omega/\square]$ | HTCR [ppm/K] |
| --- | --- | --- | --- | --- |
| 1 | 22.2/77.8 | 24 | 64.6 | 2247 |
| 2 | 22.2/77.8 | 24 | 179 | 2154 |
| 3 | 22.2/77.8 | 28 | 353 | 1530 |

In order to characterize the temperature behaviour of the electric resistance of the resistor films produced according to example 3, the resistance in the range between 0° C. is determined while a current of 0.1 mA is applied. The sole FIGURE represents the dependency of the resistance, expressed by the ratio of the resistance at temperature T [°C] to the resistance at 0° C., $T_T/R_0$, upon the temperature T.

We claim:

1. Resistor composition consisting of 10-95% glass frit, and the balance at least one oxide selected from the group consisting of $CaCu_3Ru_4O_{12}$ and $LaCu_3Ru_4O_{12}$, said frit being at least one frit selected from the group consisting of a lead aluminosilicate glass frit and a lead aluminoborosilicate glass frit, said composition having a temperature coefficient of resistance greater than 1000 ppm/K in a range between 25° C. and 125° C. at a sheet resistance of 10-500 ohm/square.

2. Resistor composition in accordance with claim 1, wherein said composition consists of 10-50 wt.-% oxide and 50-90 wt.-% glass frit.

3. Resistor composition in accordance with claim 1, wherein said composition consists of $CaCu_3Ru_4O_{12}$ and said at least one glass frit.

4. Resistor composition in accordance with claim 1, wherein said composition consists of $LaCu_3Ru_4O_{12}$ and said at least one glass frit.

5. A sensor for temperature measurement having a temperature-dependent resistor film produced by firing a resistor composition which consists of 10-95 wt.-% glass frit and the balance at least one oxide selected from the group consisting of $CaCu_3Ru_4O_1$ and $LaCu_3Ru_4O_{12}$, said glass frit being selected from the group consisting of a lead aluminosilicate glass frit and a aluninoborosilicate glass frit, said film having a temperature coefficient of resistance greater than 1000 ppm/K in a range between 25° C. and 125° C. at a sheet resistance of 10-500 ohm/square.

* * * * *